United States Patent [19]

Davidson

[11] Patent Number: 4,743,578

[45] Date of Patent: May 10, 1988

[54] CERAMIC STRUCTURES

[75] Inventor: Peter J. Davidson, Darlington, England

[73] Assignee: Imperial Chemical Industries PLC, London, England

[21] Appl. No.: 925,911

[22] Filed: Nov. 3, 1986

[30] Foreign Application Priority Data

Nov. 13, 1985 [GB] United Kingdom ............... 8528031

[51] Int. Cl.$^4$ .................... B01J 32/00; B01J 35/04
[52] U.S. Cl. .................................. 502/439; 502/527; 428/116
[58] Field of Search ................. 502/439, 527; 428/116

[56] References Cited

U.S. PATENT DOCUMENTS

| Re. 32,044 | 6/1984 | Atwood et al. | 502/527 X |
|---|---|---|---|
| 3,489,208 | 1/1970 | Manteufel | 165/109 |
| 3,903,341 | 9/1975 | Gerhold | 428/116 |
| 3,904,551 | 9/1975 | Lundsager et al. | 502/527 X |
| 4,135,018 | 1/1979 | Bonin et al. | 428/116 |
| 4,253,992 | 3/1981 | Soejima et al. | 502/527 X |

FOREIGN PATENT DOCUMENTS 907289 2/1954 Fed. Rep. of Germany.

Primary Examiner—W. J. Shine
Attorney, Agent, or Firm—Cushman, Darby & Cushman

[57] ABSTRACT

A self-supporting structure, particularly for use as a support for a catalyst, e.g. for secondary steam reforming of hydrocarbons, comprises an assembly of interlocking units, preferably of prismatic polygonal, e.g. hexagonal, configuration. Each unit is provided with projections in its upper part enabling the unit to be supported on a complementary projection in the lower part of an adjacent unit and/or on a supporting member of a vessel containing the assembly. As the structure heats or cools, expansion and contraction of the units relative to the containing vessel is accommodated by the structure bowing.

7 Claims, 10 Drawing Sheets

CERAMIC STRUCTURES

This invention relates to ceramic structures and in particular to ceramic structures for use as catalyst supports.

For some catalytic processes it is desirable to use a catalyst in the form of an active material supported on a structure that is in an ordered configuration within a reaction vessel instead of being in a randomly disposed, eg particulate, bed.

Such ordered structures generally have a multiplicity of through channels for passage of reactants. In order to present a high geometric surface, the channels are generally of relatively small cross-sectional dimensions and are closely spaced to one another: for example there may be used a thin-walled ceramic honeycomb structure.

While such structures generally have adequate strength for many applications, where high temperatures and/or high rates of temperature change are liable to be encountered, significant expansion or contraction of the structure relative to the containing vessel or even between different parts of the structure may be encountered, eg where there is non-uniformity of temperature across the structure. Unless the structure is capable of movement to accommodate such expansion and contraction, stresses leading to cracking and/or crushing of parts of the multichannel structure are liable to occur.

One method of accommodating this problem is to construct the structure in the form of a plurality of units each of which rests on a support extending across the vessel beneath the structure. However to accommodate the movement, spaces have to be left between the units and/or between the units and the vessel walls to allow for expansion: these spaces present catalyst-free pathways for reactants through the structure. Also the support is liable to present thermal and engineering problems and may exert a significant resistance to reactants flow, thus increasing the pressure drop across the catalyst bed.

In the present invention these problems are overcome by providing the structure in the form of a self-supporting assembly of interlocking units.

Accordingly the present invention provides a self-supporting structure comprising a plurality of discrete interlocking units each consisting of a ceramic material having a plurality of channels therethrough, said individual units being capable of movement relative to one another whereby expansion or contraction of the individual units can be accommodated, said structure being supported around its periphery by a containing vessel, whereby expansion or contraction of the units relative to said vessel has the cummulative effect of causing variation in the extent of bowing of the structure.

The structure may be mounted horizontally or vertically or at any angle therebetween. However for simplicity of description the structure will be considered to be mounted essentially horizontally across a vessel having essentially vertical walls.

The structure, which may have an overall plan of a regular or irregular polygon, or may be circular, is generally supported in the vessel by one or more flanges on which at least some of the outer units of the structure rest.

Each unit preferably has the general shape of a right prism of polygonal cross-section, particularly triangular, rectangular, or hexagonal. The units preferably all have the same general shape and size, except possibly, as mentioned hereinafter, those forming the outer units of the structure. As mentioned hereinafter, some or all of the outer units of the structure may not be of polygonal cross-section but may have the shape of a polygon intersected by a curve, particularly an arc of a circle. Also, as mentioned hereinafter, the units may differ from one another in relation to the means effecting interlocking. When considering the general shape of the units, the shape of the means effecting interlocking is disregarded.

The general plan of the units are preferably equiangular and equal sided, ie regular polygons, eg equilateral triangles, squares, or regular hexagons. It will be appreciated from the following description of the construction of the structure that it is possible to employ units of differing general plan, eg square units in combination with triangular units, but this is not preferred, except in some cases in relation to the outer units of the structure.

The channels through the units are preferably regular, and, where the units have a general right prismatic form, preferably extend through the units in a direction essentially parallel to the longitudinal axis of the prism. Such units may be made by extrusion, for example by the process described in No. GB-A-1385907. Alternatively, but less preferably, the units may have irregular channels therein, eg as a result of shaping the unit from an organic polymeric material filled with a particulate ceramic material, followed by leaching or burning out the organic constituents and sintering to cause the ceramic particles to bind together.

The interlocking between the units is preferably achieved by means of recesses extending along part of the length, and projections extending along the remainder of the length, of each side of the prism.

Conveniently the recesses and projections may be made by machining a groove down each face of the prism and then inserting into each groove a key having a length corresponding to part, preferably about half, of the length of the groove. The remainder of the groove thus forms the recess. Each key has a depth greater than the depth of the groove so that, when in the groove, the key extends from the surface of the prism face, thus forming a projection that can engage with a coresponding recess in an adjacent unit. So that the key can freely enter a recess in an adjacent unit, the width of at least the projecting part of the key should be slightly less than the width of the groove. One end of the key will normally be flush with the end of the unit: the key may have its other end inclined, so that its root in the groove has a length longer than the length of the projecting part.

The key is preferably made of ceramic material and may be channel free, but, to avoid uneven stresses when heating or cooling, preferably has longitudinally extending channels similar to those of the rest of the prismatic unit. The key is conveninetly fastened in place by cementing with a suitable ceramic cement material.

According to a further aspect the present invention also provides a prismatic unit of ceramic material having a plurality of channels extending therethrough and having in plan a general shape comprising at least part of a polygon and having, in at least one prismatic face, a recess extending for part, and a projection extending from that face for the remainder, of the length of said face.

In an alternative, preferred, embodiment wherein manufacture of the units is simplified, the projections and recesses extend across the whole width of the face of the prismatic unit: thus, by machining away the upper part of a face, a ledge is formed on which a projection from an adjacent unit can rest and by machining away the lower part of a face, the remaining upper part of that face forms a projection.

The projections on a unit serve to support that unit relative to an adjacent unit. Thus a projection from the lower part of a face of one unit forms a support on which a projection from the upper part of a face of an adjacent unit can rest. Since the structure is self-supporting, each unit except, as described hereinafter, possibly those units forming the outer units of the structure, has a projection from the upper part of at least one face of the prism. Most units should have a projection from the upper part of at least two, but not all, faces of the prism. However, in order for the structure to be assembled, it may be necessary that one or more units have projections from the upper part of all faces of the prism.

As mentioned hereinbefore, some or all of the outer units of the structure may be of a different general shape to the other units. Thus where the structure is mounted in a vessel of cylindrical cross-section, the outer units may be shaped, eg by machining, so that the structure has a circular plan. In this case it is preferred that the outer units are provided with a rebated lower part so that the upper part of the outer units can be supported on an annular flange or rebate in the vessel walls.

Alternatively the outer units may comprise polygonal units of differing shapes to fill partially the space between the assembly of regular units and the circrumscribed circle.

The size of the individual units should be such that they are not a tight fit relative to one another so that relative movement between adjacent units is possible. However it may be desirable to insert, during or after assembly, a compressible material, eg ceramic fibre wadding, between adjacent units.

BRIEF DESCRIPTION OF THE DRAWINGS

The invention is illustrated by reference to the accompanying drawings wherein:

FIG. 12 is a diagrammatic view of a typical unit derived by machining away parts of faces of a regular hexagonal prisms.

FIG. 13 is a diagrammatic plan view of an assembly of the units.

FIG. 14 is an exploded view of part of FIG. 13.

FIG. 15 is an elevation of part of the wall of the vessel used in the embodiment of FIG. 13.

FIG. 6 is a section along the line A—A of FIG. 15.

Figure 4:
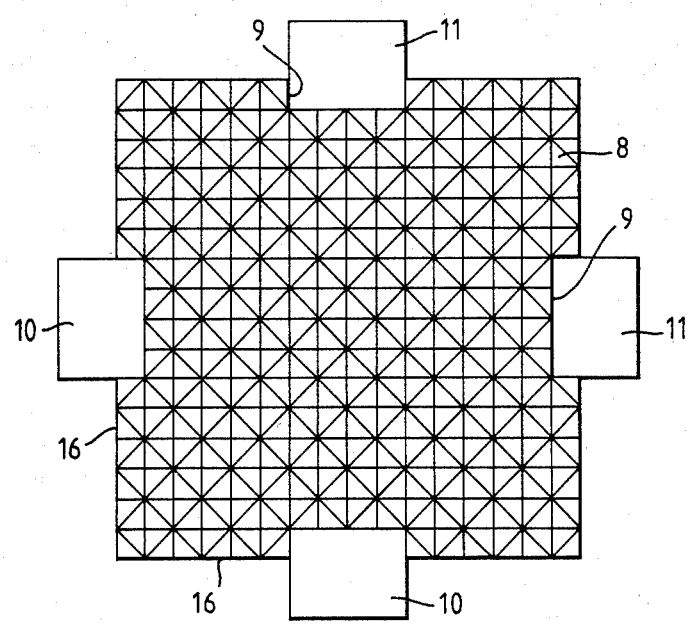
FIG. 4 is a plan view of the unit of FIG. 3.

In the drawings, for clarity, the channels through the units have been omitted except in FIG. 4. Also, except in FIGS. 1, 2 and 8, the clearances between individual units have been omitted for the sake of clarity.

Figure 1:
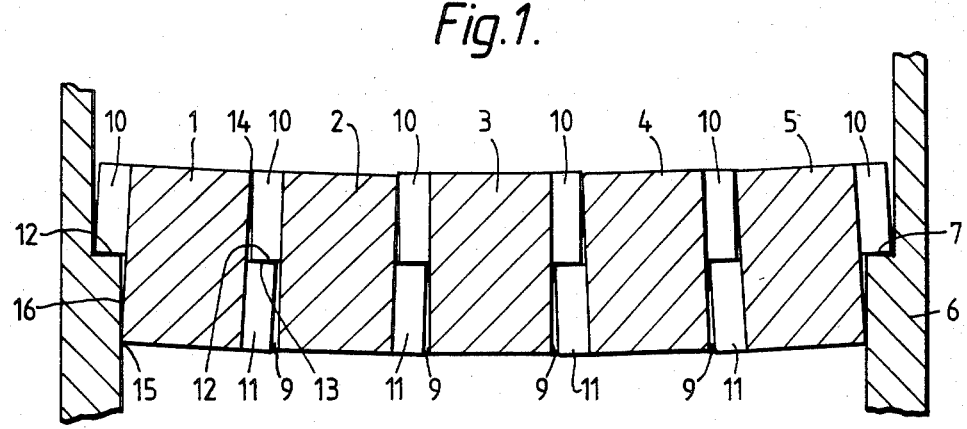
FIG. 1 is a cross-section through a vessel having a self-supporting catalyst bed wherein the vessel and bed are in the cold state.
Figure 3:
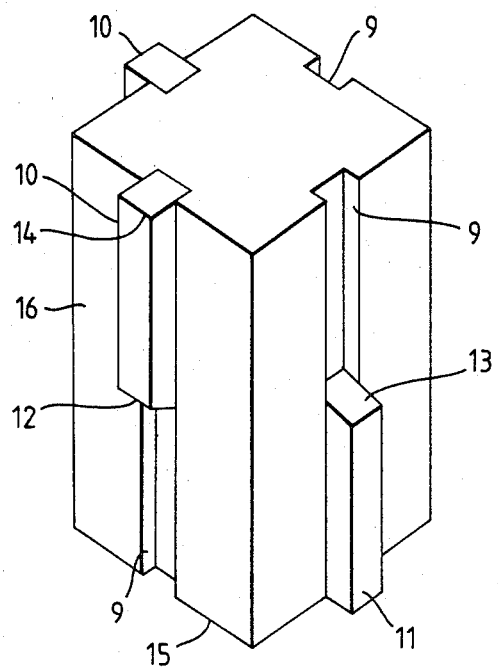
FIG. 3 is an isometric view of a single square configuration unit.
Figure 5:
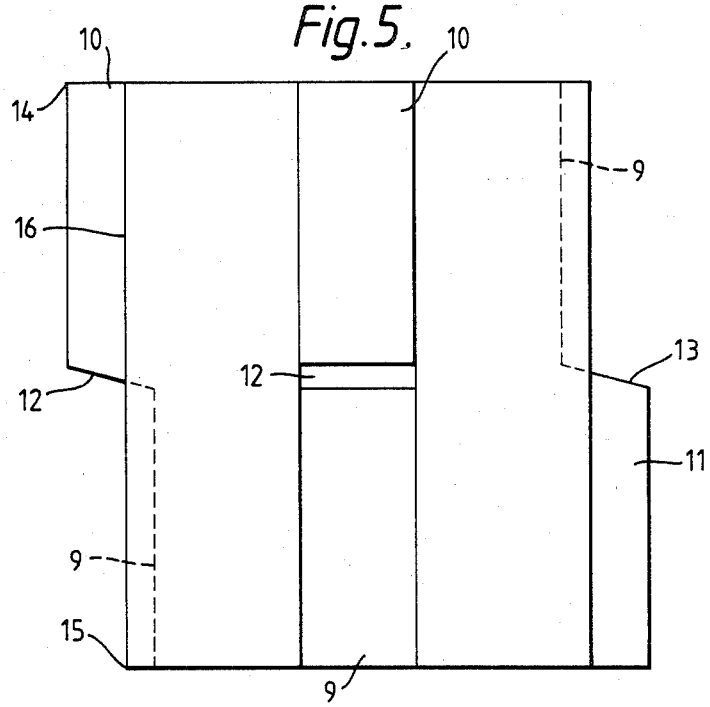
FIG. 5 is an elevation of the unit of FIG. 3.

In FIG. 1 there is shown a catalyst bed consisting of a number of units 1 to 5 mounted in a vessel having walls 6 provided with a rebate 7. Each unit (one of which is shown in FIGS. 3 to 5) is generally square in plan and is an extruded ceramic honeycomb wherein the honeycomb passages 8 extend vertically through the unit. Each prismatic face of the unit has projections formed by cementing a ceramic block into a vertical groove 9 machined, or formed during the extrusion of the honeycomb, in the face of the honeycomb extrusion.

In units 1, 2, 4 and 5 the ceramic blocks are positioned to form projections 10 extending for about the upper half of the length of the unit from one face and corresponding projections 11 extending for about the lower half of the length of the unit from the opposite face. In unit 3 the ceramic blocks are positioned to form projections 10 extending for about the upper half of the length of the unit from two opposed faces. The positioning of the projections on the other two faces of each of blocks 1 to 5 will depend on where in the structure the cross-section is taken and is further described hereinafter.

In FIG. 1 the structure is shown in the cold state and it is seen that unit 2 is supported by the lower edge 12 of its upper projection 10 resting on the upper edge 13 of the lower projection 11 of unit 1. Also, as is seen from FIG. 1, the upper edge 14 of the upper projection 10 of unit 2 bears against the bottom of the groove 9 in unit 1 above the lower projection 11 of unit 1. Unit 4 is supported in like manner by unit 5. Unit 3 is supported in like manner by units 2 and 4. Units 1 and 5 are supported by the lower edges 12 of their upper projections 10 resting on the rebate 7 in the walls 6 of the vessel and by the lower edges 15 of the faces 16 from which upper projections 10 project bearing against the walls 6 of the vessel.

It will be appreciated that, if desired, the projections and groove may be dimensioned so that it is the upper edges of the adjacent unit faces that abut, rather than the upper edge 14 of upper projection 10 abutting against the bottom of groove 9.

Figure 2:
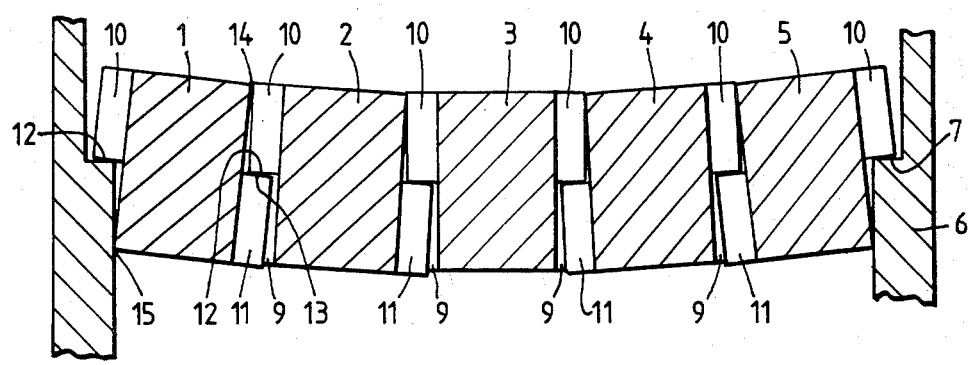
FIG. 2 is a view similar to that of FIG. 1 but in the hot, expanded, state.

In FIG. 2 the bed is shown in the heated state. For simplicity it has been assumed that the units have not expanded significantly but that the vessel has expanded through thermal expansion. In practice, of course, the units will expand, but not to such a great extent as the vessel. From FIG. 2 it is seen that the units are still supported as before but, because of the expansion of the vessel, the structure sags, or bows, to a greater extent than when cold.

In some cases the vessel may be maintained at a constant temperature, eg by a cooling jacket, and so does not expand, but the units expand. In this case the "cold" configuration will be analogous to the configuration of FIG. 2 and the "hot" configuration analogous to that of FIG. 1.

As shown in FIG. 4, the channels through the unit are of trianglular cross-section. Typically there are 10 l to 100 channels per cm² with a wall thickness of about 0.2 to 0.5 mm between adjacent channels. Other channel configurations, channel densities (i.e. no. of channels per cm²) and wall thickness may of course be employed.

Figure 6:
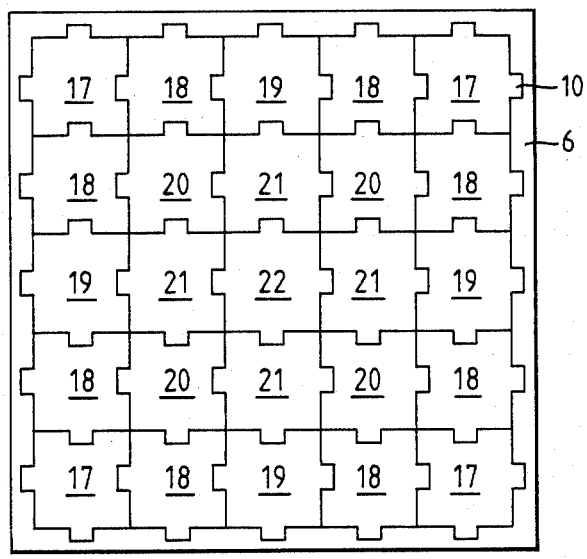
FIGS. 6 and 7 are diagramatic plan views of structures using square configuration units.

In FIG. 6 there is shown a square, symmetrical, structure composed of generally square units. For simplicity, as mentioned hereinbefore, in this Figure and FIGS. 7, 9 and 11, no gaps are shown between the units or between their projections and the corresponding recesses in adjacent units. Likewise, for clarity, the projections are shown as being integral with their respective units. In FIG. 6 the structure is made from 25 units: there are 16 type 'A' units, 8 type 'B' units, and 1 type 'C' unit. A type 'A' unit has the configuration shown in FIGS. 3 to 5, i.e. it has upper projections 10 on two adjacent faces and lower projections 11 on the other two adjacent faces. Type 'B' units have an upper projection 10 on each of three faces and a lower projection 11 on the fourth face. Type 'C' units have upper projections 10 on all four faces.

It is seen that the structure can be assembled by positioning the four outer corner units 17 (type 'A') on a support within the vessel so that the upper projection 10 thereof rest in recesses in the vessel walls 6. The eight intermediate (type 'A') units 18 of the outer square are then inserted, each with one upper projection 10 engaging in recesses in the vessel wall 6, and then the four middle (type 'B') units 19 are inserted, each with one upper projection 10 engaging in a recess in the vessel wall 6 and with the other two upper projections 10 engaging with the recesses in the intermediate units on either side of the middle unit. The intermediate square, comprising eight units, is assembled in like fashion using four type 'A' units as the corner units 20 and four type 'B' units as the middle units 21. Finally a central, type 'C', unit 22 is inserted to complete the structure: the temporary support in the vessel can then be removed. It will be appreciated that the structure can be assembled outside the vessel on a suitable support and then inserted into the vessel while still on the support which is then removed.

Figure 7:
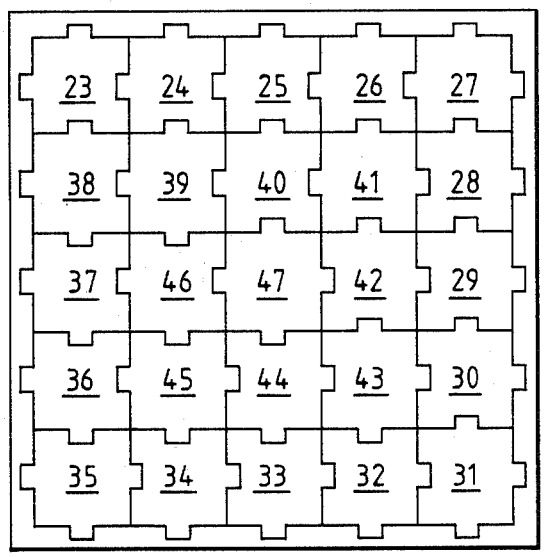

An alternative assembly is shown in FIG. 7. While lacking the symmetry of the FIG. 6 structure, it may in some cases be easier to assemble. Here the structure is again assembled from 16 type 'A' units, 8 type 'B' units, and 1 type 'C' unit, but each layer of the square is constructed in a clockwise fashion. Thus first a type 'A' unit 23 is positioned on a temporary support to form a first corner with its upper projections engaging recesses in adjacent walls of the vessel. Then three type 'A' units, 24, 25, 26 are inserted, in that order, each with one upper projection engaging a recess in the vessel wall and one upper projection engaging with a recess in the preceding unit. A type 'B' unit 27 is then inserted with two upper projections engaging recesses in the vessel walls and one upper projection engaging a recess in unit 26. This completes one side of the outer layer. The adjacent side is then assembled in like manner from three type 'A' units 28, 29, 30 and a type 'B' unit 31 forming the third corner. The third side is then assembled in like manner from three type 'A' units 32, 33, 34 and a type 'B' unit 35 forming the fourth corner. The fourth side is assembled from two type 'A' units 36, 37 and a type 'B' unit 38. The intermediate layer is assembled in similar fashion from four type 'A' units 39, 40, 42 and 44 and four type 'B' units 41, 43, 45, 46 and then the central type 'C' unit 47 is inserted.

While in theory it is possible to use units having only one upper projection 10 and three lower projections 11, structures incorporating such units are less well supported and so are not preferred.

Figure 8:
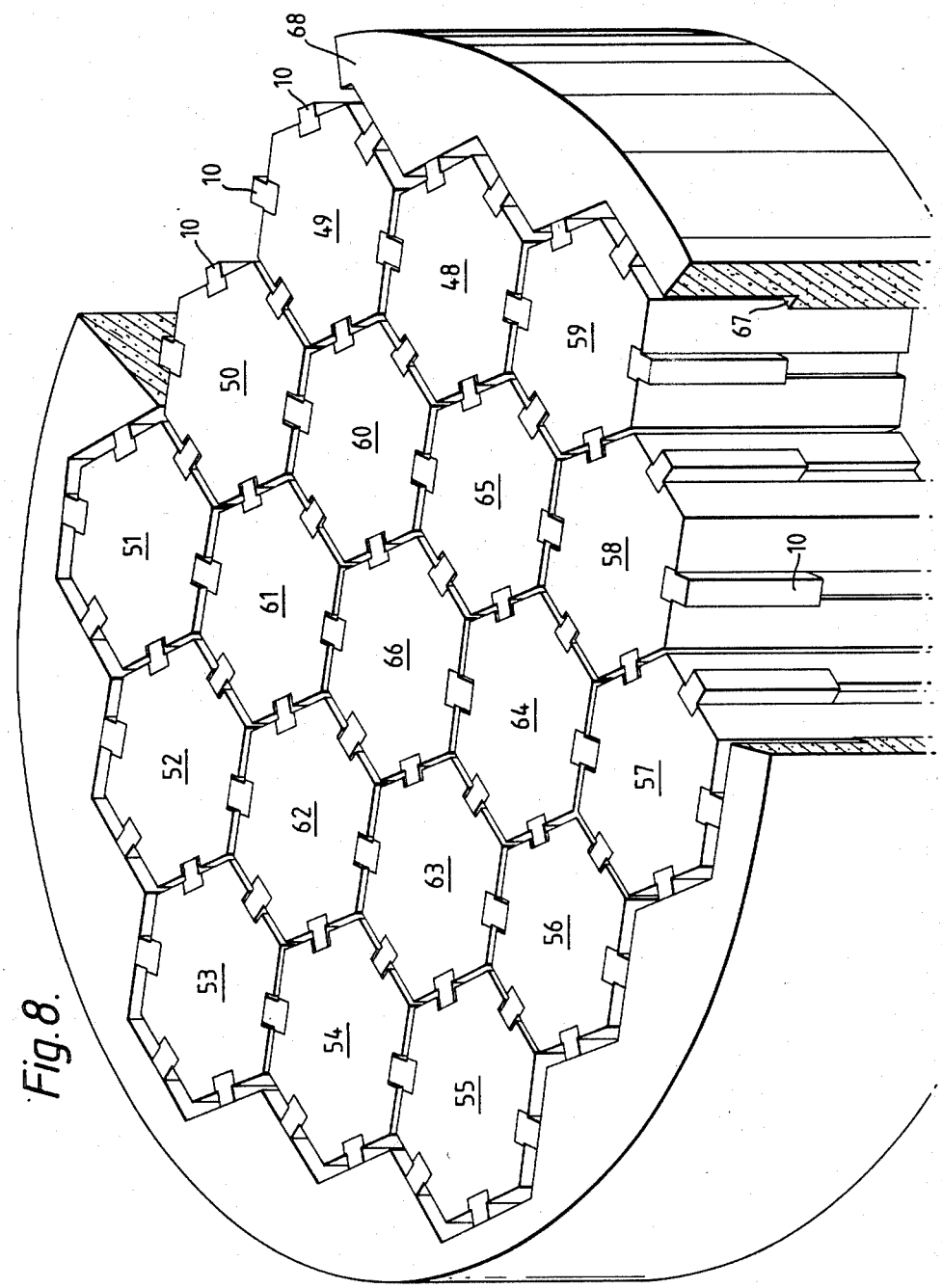
FIG. 8 is an isometric view of a structure using hexagonal configuration units, with part of the vessel wall cut away.

In FIG. 8 a structue comprising nineteen hexagonal units is shown. This structure is assembled in similar fashion to that of FIG. 7, built up in layers, from the outside inwards, but in this case in an anticlockwise direction. This structure employs five different types of units:

| Type | No. of upper projections | No. of units required | Unit Nos. |
|------|--------------------------|----------------------|-----------|
| D | 2 | 1 | 48 |
| E | 3 | 6 | 50, 52, 54, 56, 58, 60 |
| F | 4 | 9 | 49, 51, 53, 55, 57, 61, 62, 63, 64 |
| G | 5 | 2 | 59, 65 |
| H | 6 | 1 | 66 |

It is seen from FIG. 8 that the outer layer (units 48 to 59) are supported by their upper projections 10 in two or three adjacent faces resting on a rebate 67 of a ring 68 attached to, or forming part of, the vessel walls. The ring 68 has an interior surface contoured to follow the outline of the assembly of the units to minimise passage of reactants between the structure and the vessel walls.

Figure 10:
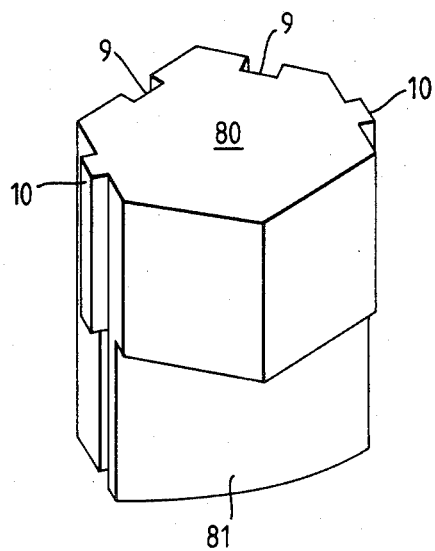
FIG. 10 is an isometric view of the unit missing from the arrangement of FIG. 9.
Figure 9:
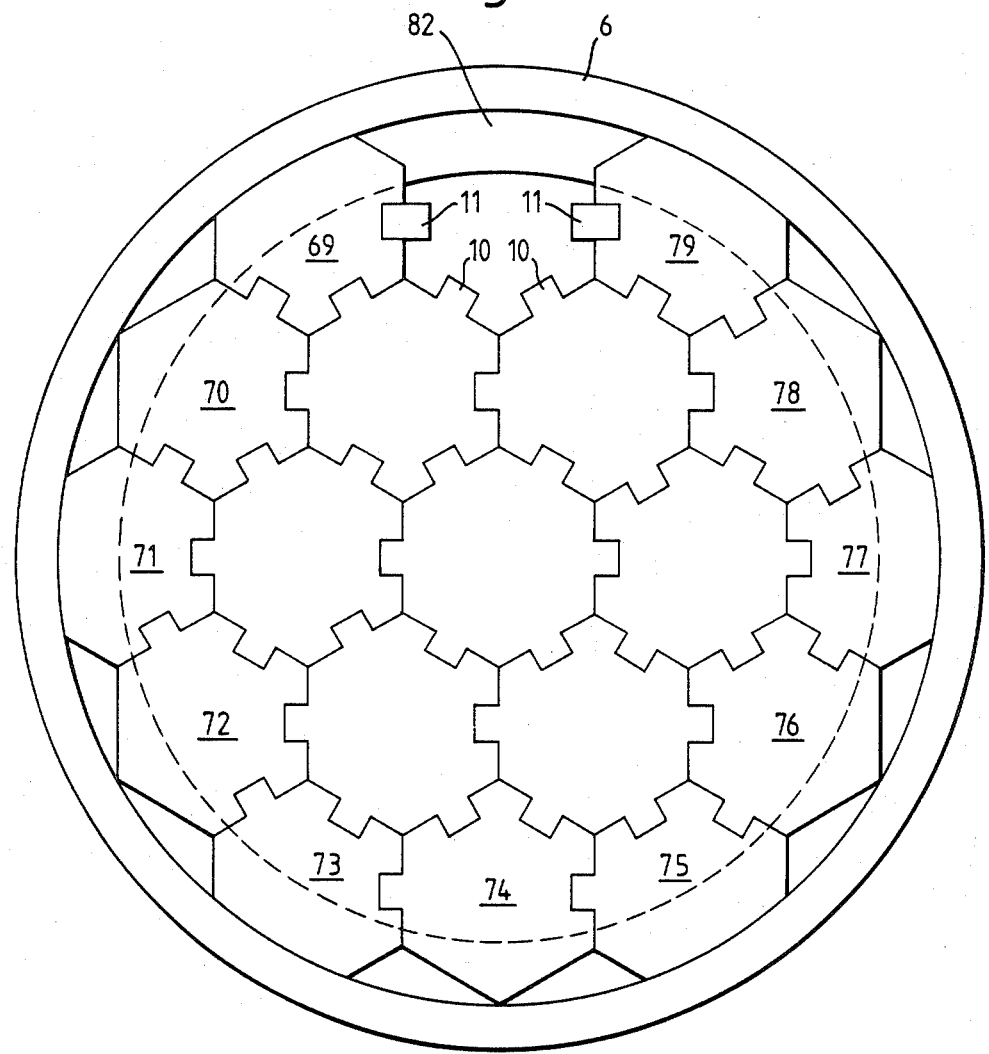
FIG. 9 is a plan of an alternative arrangement to FIG. 8, with one of the outer units omitted for clarity.

Alternatively as shown in FIGS. 9 and 10 the units 69-80 of the outer layer are machined to give the assembly a circular outline with a rebate 81 machined in the lower part of these outer units to enable these units to be supported by an annular flange 82 fastened to the wall 6 of the vessel.

Since in this arrangement the outer units are supported by rebate 81 engaging with flange 82, these outer units do not have upper projections in the faces adjacent the vessel wall 6. Indeed, for at least one of these units, ie unit 69, it is not necessary that the unit has any upper projections.

Figure 11:
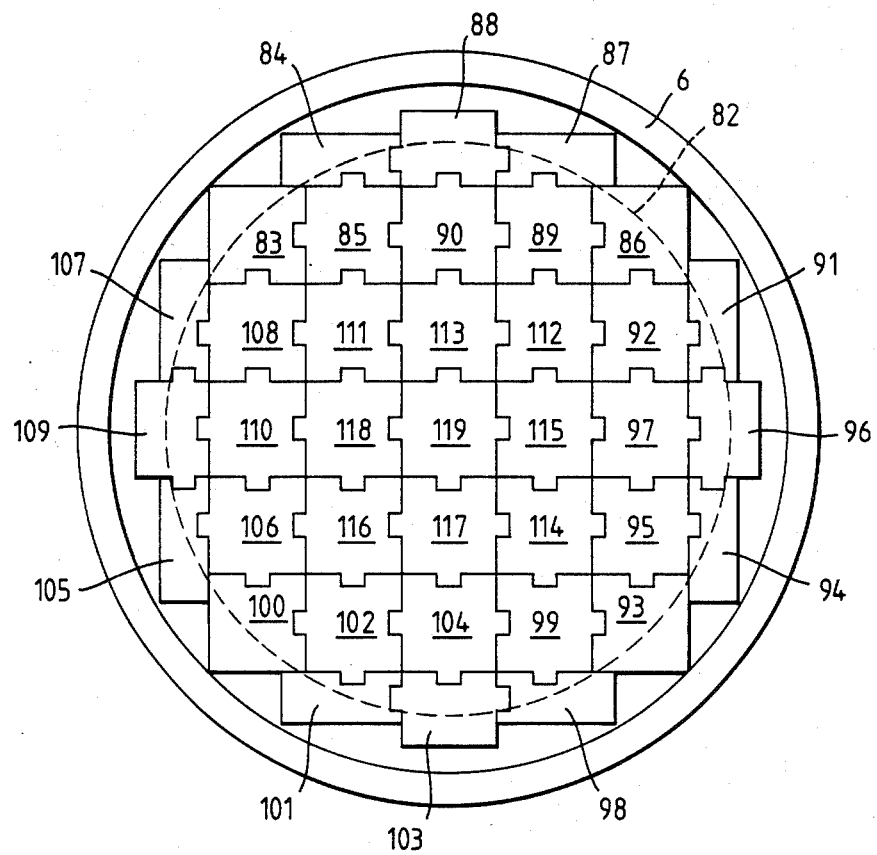
FIG. 11 is a diagramatic plan view similar to FIG. 6 wherein the bed is composed of square units and additional rectangular outer units.

As shown in FIG. 11, to minimise wasted vessel cross-section, the outer layer of the structure may be composed of units of different general shape to the units forming the rest of the structure. Thus this structure is assembled from twelve rectangular units (eight of which are elongated) and twentyfive square units. Assembly is in the numerical order 83 to 119. In this assembly, rebates are formed in the lower parts of the outer units 83, 84, 86, 87, 88, 91, 93, 94, 96, 98, 100, 101, 103, 105, 107 and 109 so that they can be supported by flange 82 (the inner edge of which is shown dotted) fixed to the vessel walls 6. Therefore it is unnecessary that those faces of these outer units that are adjacent the vessel walls have other upper projections.

In the embodiment shown in FIGS. 12 to 16, the units are derived from regular hexagonal prisms by machining away the lower part of one or more of the prism faces across the whole width of the face and, in the case of most of the units, also by machining away the upper part of one or more of the faces across the whole width of the face.

Figure 12:
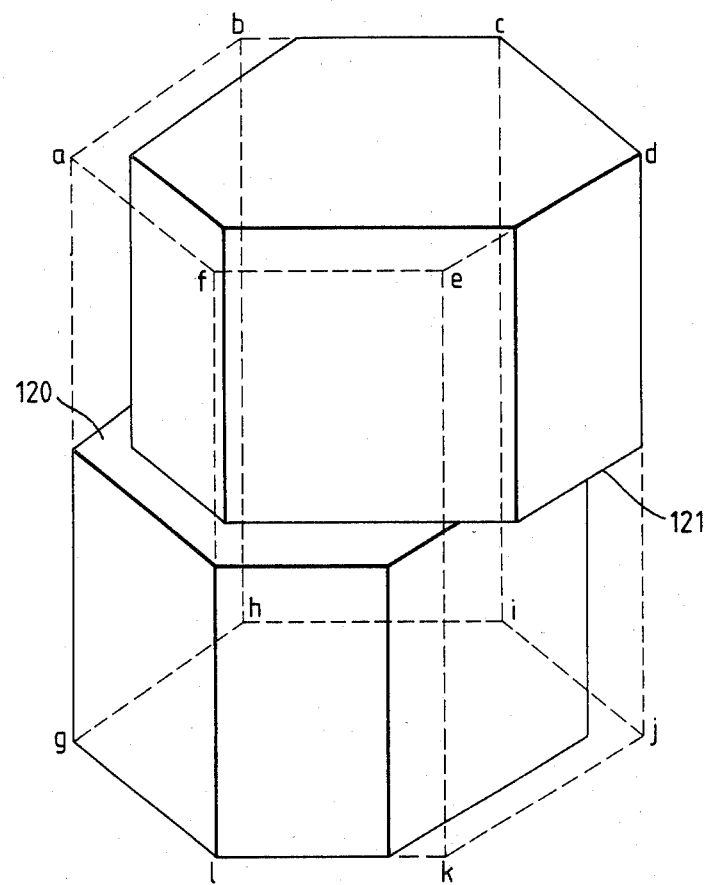
FIGS. 12 to 16 illustrate an alternative embodiment wherein the projections and recesses extend across the whole width of the prism face.

A typical unit, in fact a type "R" unit as described hereinafter, is shown in FIG. 12 and the hexagon "abcdefghijlk" from which it is derived is shown in broken lines. It is seen that this unit is derived from the hexagon by machining away the upper half of faces "abhg", "aflg", and "eflk", and the lower half of faces "dekj"

and "cdji". Although not apparent from FIG. 12, the lower half of face "bcih" is also machined away. The machining away of the upper faces thus provides ledges 120, while the machining away of the lower faces provides projections 121. The resultant unit has the appearance of two hexagonal prisms, wherein the hexagonal ends have angles of 120° between adjacent sides but do not have all their sides equal, stacked off-set on one another.

Figure 13:
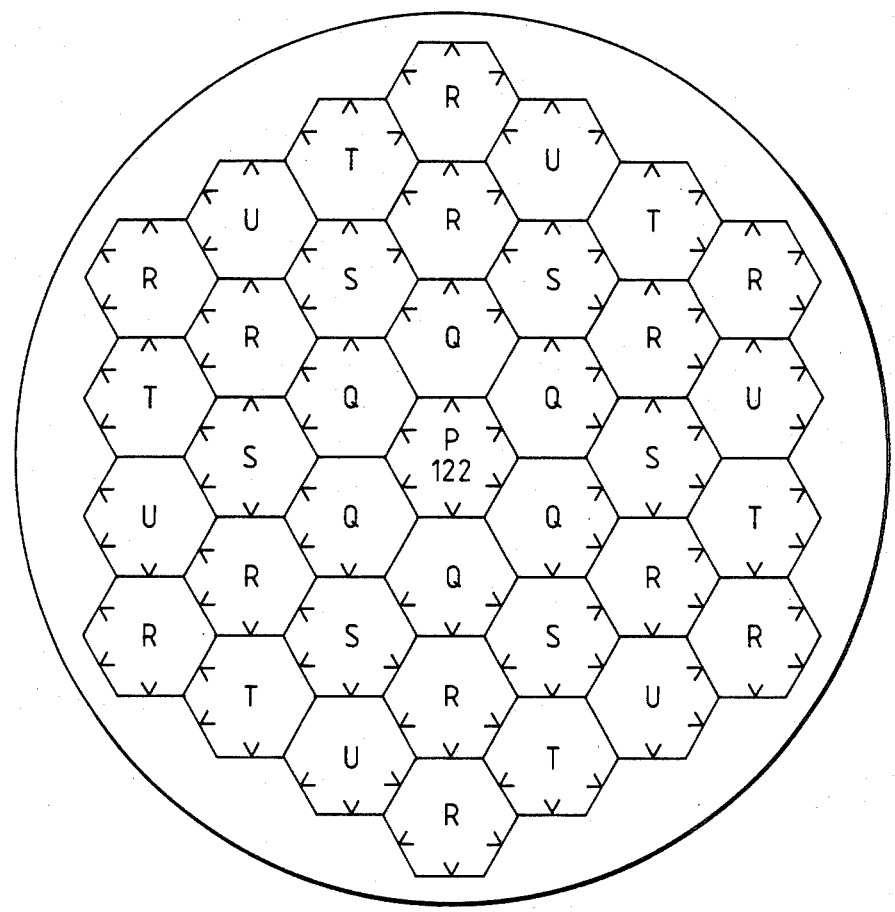

In the assembly shown diagrammatically in FIG. 13, the units are depicted for simplicity as regular hexagons, but as will be apparent from the following description only the central unit 122 in fact is regular. In this Figure most of the lines depicted the hexagons have a "V" mark. This is used here to denote that the lower part of the relevant face of the hexagon within which the "V" is situated is cut away. Thus each "V" denotes a "projection". The assembly shown in FIG. 13 is formed from one central unit 122, designated a type "P" unit; a ring of six units, type "Q", surrounding the central unit 122; a ring of twelve units, alternating type "R" and type "S", around the ring of "Q" units; and an outer ring of eighteen units, in repeating anticlockwise sequence "R"-"T"-"U".

In type "P" units, the lower part of all six rectangular faces of the hexagon are machined away. In type "Q" units, the lower parts of four adjacent rectangular faces are machined away, and then, clockwise, the upper parts of the last of those four faces and of the next adjacent rectangular face are machined away. In type "R" units, as shown in FIG. 12, the upper parts of three adjacent rectangular faces, and the lower parts of the other three rectangular faces, are machined away. In type "S" units, the upper parts of two adjacent rectangular faces, and the lower parts of the other four rectangular faces, are machined away. In type "T" units, the lower parts of three adjacent rectangular faces are machined away, and then, clockwise, the upper parts of the next two adjacent rectangular faces, are machined away. In type "U" units, the lower parts of four adjacent rectangular faces are machined away, and then, clockwise, the upper parts of the last of those four faces and of the next two adjacent rectangular faces, are machined away. In another form of the assembly, as described below, another type of unit, type "Z", is required. In type "Z" units the lower parts of five rectangular faces, and the upper part of the other rectangular face, are machined away.

The assembly of FIG. 13 is constructed by forming the outer ring of "R", "U" and "T" units, inserting the "R" units before the adjacent "T" and "U" units. The ring of "R" and "S" units is then inserted, with the "R" units inserted before the "S" units. Then the ring of "Q" units is inserted and finally the central "P" unit 122.

Figure 14:
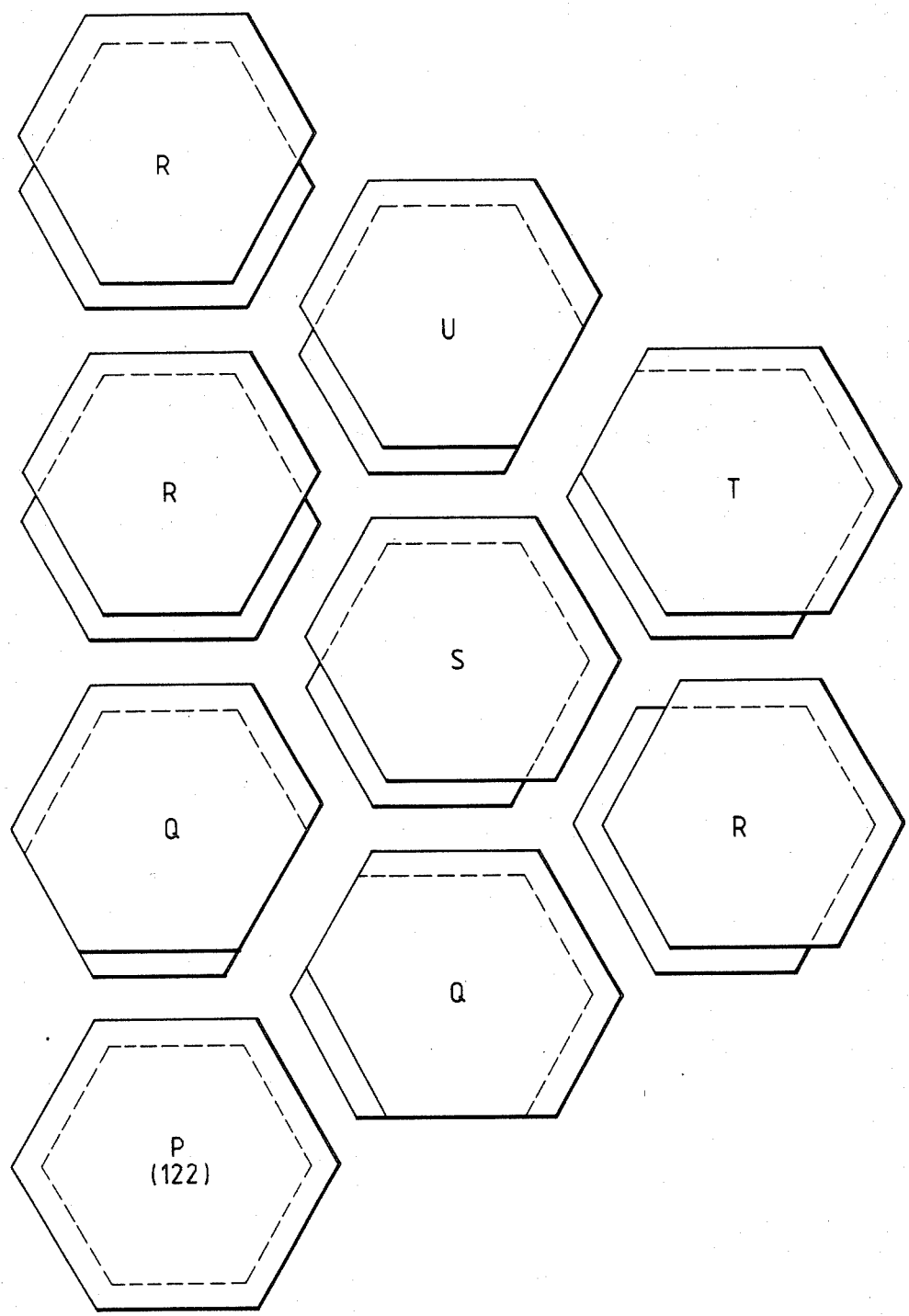

In FIG. 14, part of the assembly of FIG. 13 is depicted in an exploded state and the units are shown with their irregular hexagonal form. By the use of dotted lines where necessary, the outlines of the lower portions of the units are shown.

It will be noted that, because in "Q" units one face is not machined at all and on another face both the upper and lower portions are machined away leaving a smooth face, there are no projections and corresponding ledges between adjacent "Q" units. Similarly because one face of a "T" unit is not machined and both the upper and lower portions of one face of a "U" unit are machined away, there are no ledges and projections between adjacent "T" and "U" units. The provision of projections and ledges between such adjacent units would not contribute to the support of such units. It is believed that the assembly of FIG. 13 provides the optimum load distribution. However in some cases, because of the lack of ledges and projections therebetween, there is a possibility that gas can flow between adjacent "Q" units and/or between adjacent "T" and "U" units. Where it is desired to minimise the possibility of gas flow between adjacent units rather than through the units, alternative assemblies may be employed. Thus the ring of "Q" units may be replaced by a ring of alternating "R" and "Z" units, or by a ring composed of, in anticlockwise direction, a "R" unit, four "S" units and a "Z" unit; and the "U" and "T" units may be replaced by "R" and "S" units respectively.

Figure 15:
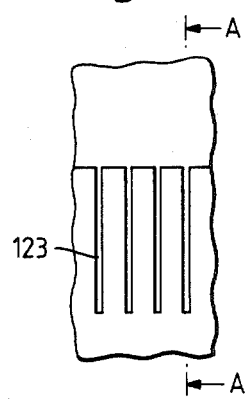
Figure 16:
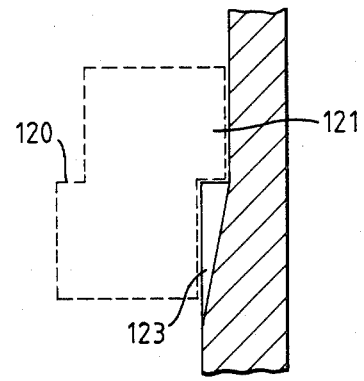

One problem that may arise in some applications, particularly where the projections are formed by machining away across the whole face of the prism, is that the flow of gas through the channels in the projections supported at the vessel wall may be impeded by the support on the vessel wall. This can in some cases lead to a stagnant column of gas in those channels and may present uneven hearing and/or cooling of the parts of the units adjacent the vessel walls in relation to the rest of the unit. As shown in FIGS. 15 and 16 this problem may be overcome by providing a plurality of slots 123 in the ledge on the vessel wall supporting the unit to provide a route for gas flow between the channels through those projecting parts and the interior of the vessel below the units. The position of the unit is shown dotted in FIG. 16. An alternative solution is to provide a plurality of holes drilled horizontally through the lower portion of these projecting parts of the unit that are to be supported by the vessel wall ledge. In this way gas can flow between channels extending through the whole length of the unit and the channels extending through those projecting parts.

It will be appreciated that the number of units employed will depend on the shape and size of the individual units and the desired area of the bed: while for simplicity in the drawings the size of the units is such that the greatest dimension of the vessel cross-section is spanned by no more than seven units (in FIG. 11), in practice larger numbers can be employed. Preferably the size and shape of the units is such that the greater dimension of the vessel cross-section is spanned by 3 to 15 units. Each unit preferably has a ratio of height, ie length of the through channels, to maximum unit cross-sectional dimension in the range 1 to 20.

The structures of the invention can be used as supports for catalysts in a wide variety of catalytic reactions. The nature of the catalyst will depend, of course, on the reaction envisaged. The catalytic material, or material convertible thereto, e.g. by reduction, may be incorporated as one or more of the constituents of the ceramic material or may be deposited thereon as a coating: alternatively it may be incorporated by impregnation.

One particular type of process where the structures of the invention are of particular utility is for the production of hydrogen-containing gas streams by the reaction of a hydrocarbon feedstock with steam, carbon dioxide and/or oxygen (as such or as air or oxygen enriched air). In such a process the reactants are passed through the structure wherein the units are coated, or impregnated, with a suitable catalyst. For such processes the catalytically active material is generally nickel, alone or in conjunction with one or more other metals of Group VIII of the Periodic Table optionally together with a stabiliser such as alumina. Desirably for such processes, particularly where steam is a reactant, the ceramic support should be essentially free from silica. The production of silica-free extrudates, which are suitable for the manufacture of the units of the structure, is described in No. EP-A-134138.

The structures are of particular utility in the so called partial oxidation or secondary reforming processes wherein a gas stream comprising a hydrocarbon, eg methane, and optionally steam is reacted with a limited amount of oxygen (or air or oxygen-enriched air). The heat evolved by the exothermic reaction of the hydrocarbon and oxygen provides the heat required for the endothermic reaction of the hydrocarbon and steam. Such processes, which may follow a primary reforming step wherein a hydrocarbon is reacted with steam in a heated vessel, are normally carried out with a high catalyst bed exit temperature, typically above 800° C. and generally in the range 900° to 1200° C., in order to give a gas stream of low methane content. The pressure employed is usually in the rnage 1–60 bar abs., particularly 10–50 bar abs.

In some processes it may be desirable to employ a plurality of catalyst beds: thus structures of the type described herein may be disposed one above the other, normally with a space between each bed.

I claim:

1. A self-supporting structure disposed within a containing vessel and comprising a plurality of discrete interlocking units, each unit consisting of a ceramic material having a plurality of channels therethrough, and having the general shape of a right prism of polygonal cross section having rectangular prism faces, having at least one upper projection extending from the upper part of the unit, each upper projection corresponding to a rectangular prism face, said units being disposed such that each unit that is disposed adjacent the walls of the containing vessel has an upper projection resting upon a supporting surface of the containing vessel, and each one unit that is not adjacent the walls of the containing vessel has an upper projection resting upon a lower projection extending from the lower part, and corresponding to a rectangular prism face, of the unit that is adjacent to said one unit and is between said one unit and the wall of the containing vessel, the individual units being capable of sufficient movement relative to one another that expansion or contraction of the individual units can be accommodated, whereby expansion or contraction of the units relative to the vessel has the cummulative effect of causing variation in the extent of bowing of the structure.

2. A structure according to claim 1 wherein each unit has the general shape of a right prism of regular hexagonal cross section.

3. A structure according to claim 1 wherein each unit has at least two upper projections.

4. A structure according to claim 1 wherein the units are disposed in concentric rings of units with each unit of the outermost ring having an upper projection resting on the supporting surface of the containing vessel and each one unit of each one ring within said outermost ring having an upper projection of resting on a lower projection of an adjacent unit in the ring next outside that one ring.

5. A structure according to claim 4 wherein each unit of said rings of units has at least two upper projections and at least one lower projection corresponding to a rectangular prism face other than those rectangular prism faces corresponding to said upper projections, whereby an upper projection of each unit of a ring of units rests upon a lower projection of an adjacent unit in the same ring of units.

6. A structure according to claim 4 wherein a single central unit having upper projections corresponding to each rectangular prism face is disposed within the innermost ring of units, with the upper projections of the central unit resting upon lower projections of the units of said innermost ring of units.

7. A structure according to claim 1 wherein each upper projection is formed by machining away the lower part of a rectangular face of the prism, and each lower projection is formed by machining away the upper part of a rectangular face of the prism.

* * * * *